(12) United States Patent
Dixon et al.

(10) Patent No.: US 9,495,174 B2
(45) Date of Patent: Nov. 15, 2016

(54) AGNOSTIC PROCESSING OF RESOURCE REQUESTS TO MESSAGE QUEUES AND SEQUENTIAL FILES

(75) Inventors: Bret W. Dixon, South Perth (AU); Billy Joe Soper, Lesmurdie (AU)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 12/348,243

(22) Filed: Jan. 2, 2009

(65) Prior Publication Data

US 2010/0174696 A1  Jul. 8, 2010

(51) Int. Cl.
*G06F 9/54* (2006.01)
*G06F 9/44* (2006.01)
*G06F 17/30* (2006.01)

(52) U.S. Cl.
CPC ............ *G06F 9/4426* (2013.01); *G06F 9/541* (2013.01); *G06F 9/546* (2013.01); *G06F 17/30091* (2013.01); *G06F 17/30115* (2013.01)

(58) Field of Classification Search
None
See application file for complete search history.

(56) References Cited

U.S. PATENT DOCUMENTS

| | | | | |
|---|---|---|---|---|
| 5,668,958 A | * | 9/1997 | Bendert et al. | 710/305 |
| 5,828,881 A | * | 10/1998 | Wang | G06F 9/4843 709/234 |
| 6,889,256 B1 | * | 5/2005 | Palevich et al. | 709/229 |
| 2001/0052031 A1 | * | 12/2001 | Kinkade | 709/314 |
| 2003/0016685 A1 | * | 1/2003 | Berggreen | H04L 12/5693 370/412 |

OTHER PUBLICATIONS

Card, R.; Ts'o, T.; Tweedie, S., "Design and Implementation of the Second Extended Filesystem", (Dec. 1994), Proceedings of the First Dutch Interantional Symposium on Linux, pp. 1-11 [retrieved from http://citeseerx.ist.psu.edu/viewdoc/summary?doi=10.1.1.103.1571].*

Ahn, B.; Sohn, S.; Kim, C.; Cha, G.; Baek, Y.; Jung, S.; Kim, M., "Implementation and Evaluation of EXT3NS Multimedia File System" (Oct. 10-16, 2004), Proceedings of the 12th annual ACM international conference on Multimedia (Multimedia '04). ACM, New York, NY, USA, pp. 588-595. [retrieved from http://portal.acm.org/citation.cfm?id=1027668].*

Muthukrishnan, S.; Kilkarni, S., "Webfs: a File System Interface to the World Wide Web" (Dec. 13, 1999), Univertiy fo Wisconsin-Madison, pp. 1-21 [retrieved from http://pages.cs.wisc.edu/~sambavi/part1.doc].*

Tanenbaum, A., "Modern Operating Systems", 2nd Edition (2001), Prentice-Hall, Inc., pp. 379-449.*

Merriam-Webster's Collegiate Dictionary, 10th ed. (1999), p. 600.*

(Continued)

*Primary Examiner* — Brian W Wathen
(74) *Attorney, Agent, or Firm* — Steven M. Greenberg, Esq.; CRGO Law

(57) ABSTRACT

Embodiments of the present invention provide a method, system and computer program product for agnostic processing of message queues and sequential files. In an embodiment of the invention, a method for agnostic processing of message queues and sequential files can be provided. The method can include receiving an access request for a resource that is uniform for both a message queue and a sequential file and identifying a resource type of the resource. In response to identifying the resource type as a message queue, a corresponding access request specific to a message queue can be invoked in the message queue. Otherwise a corresponding access request specific to a sequential file can be invoked responsive to identifying the resource type as a sequential file.

3 Claims, 1 Drawing Sheet

(56) References Cited

OTHER PUBLICATIONS

Microsoft Computer Dictionary, 5$^{th}$ Edition (2002), pp. 246, 578.*
Tanenbaum, A., "Modern Operating Systems", 3rd Edition (2007), pp. 1-1076.*
"Runtime", Techterms.com, (Oct. 21, 2008) [retrieved from https://web.archive.org/web/20081021142621/http://www.techterms.com/definition/runtime].*
Stackoverflow.com, "What is run time environment", p. 1 [retrieved on Feb. 28, 2016 from http://stackoverflow.com/questions/3710130/what-is-run-time-environment].*
Reddy, M., "API Design for C++" (2011), Morgan Kaufmann Publishers, pp. 1, 68.*
Je, J., "Linux System Call Quick Reference" (Dec. 3, 2008), pp. 1-3 [retrieved from https://web.archive.org/web/20081203003802/http://www.digilife.be/quickreferences/QRC/LINUX%20System%20Call%20Quick%20Reference.pdf].*
Webster's New World Computer Dictionary, 9$^{th}$ Edition (2001), pp. 322.*
Silberschatz et al., "Operating System Concepts", 7th Edition (2005), John Wiley & Sons, inc., pp. 417-419.*
Pilot, M.; "Util to Manipulate Msg Queues and other Files Types"; http://icebox.stratus.com/vos/doc/answers/convert_files.txt; accessed on Jan. 2, 2009.
"Unloading and Reloading Queue Pools"; http://publib.boulder.ibm.com/infocenter/cicsts/v3r1/index.jsp?topic=/com.ibm.cics.ts31.doc/dfha2/dfha221.htm; Accessed on Jan. 2, 2009.
"MD10: Withdrawn: MQSeries in the MVS/ESA Batch Environment"; http://www-01.ibm.com/support/docview.wss?rs=171&uid=swg24000082&loc=en_US&cs=utf-8&lang=en; Accessed on Jan. 2, 2009.

* cited by examiner

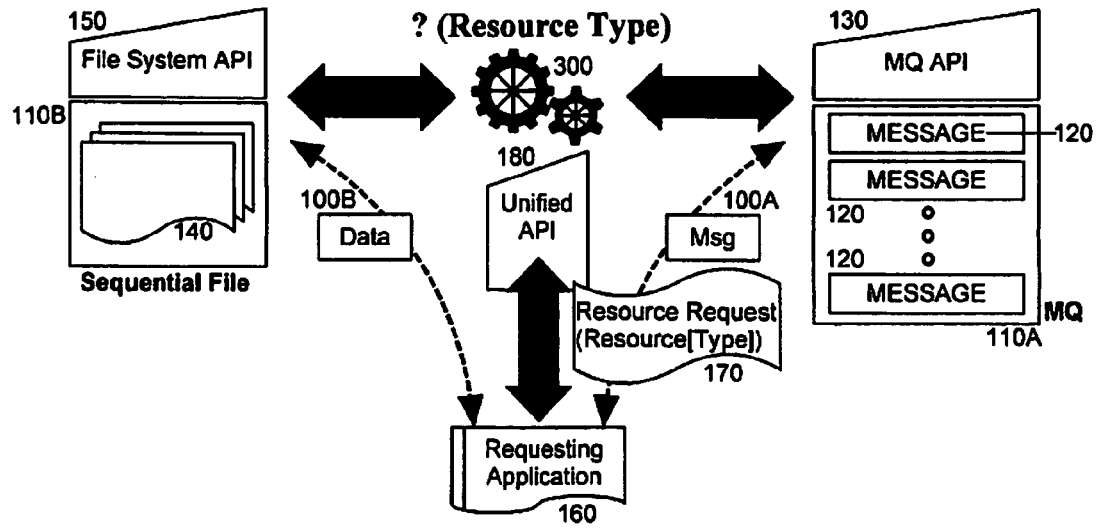
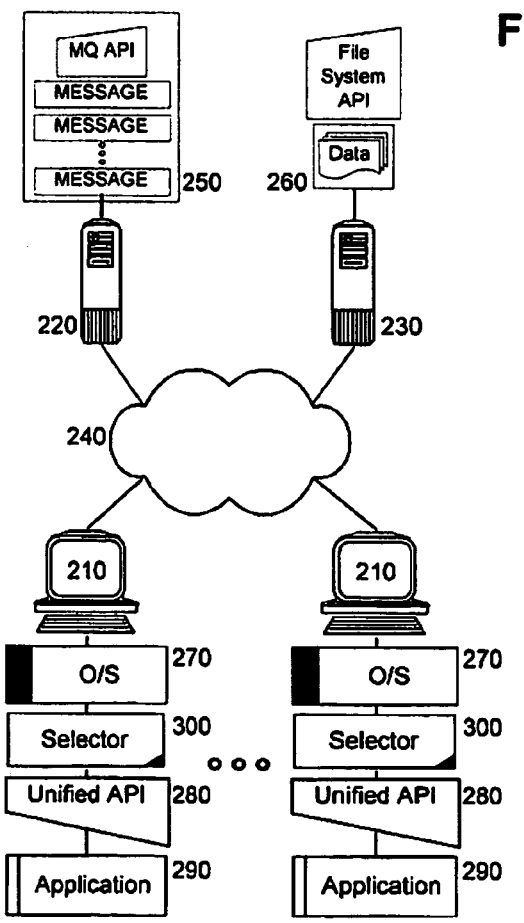
FIG. 2
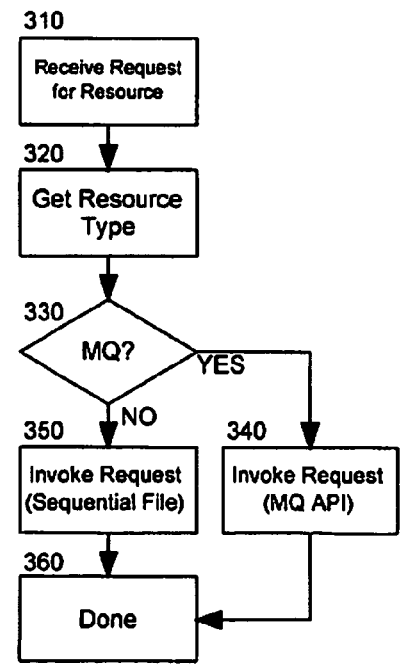
FIG. 3

AGNOSTIC PROCESSING OF RESOURCE REQUESTS TO MESSAGE QUEUES AND SEQUENTIAL FILES

BACKGROUND OF THE INVENTION

1. Field of the Invention

The present invention relates to the field of message queue and sequential file management and more particularly to the programmatic access to a message queue and also programmatic access to a sequential file.

2. Description of the Related Art

In the field of information technology, a message queue is a software-engineering component used for inter-process communications or inter-thread communications. The component employs a queue into which messages can be placed by a messenger and from which messages can be retrieved by a designated recipient. In this regard, the message queue can be a communicative component enabling asynchronous messaging as between the messenger and the designated recipient. Operationally, the message queue can support multiple messengers and recipients such that asynchronous communications can be achieved for a group of participants.

The asynchronous nature of the message queue provides for an ideal technology coupler for disparate technologies. Specifically, so long as separate technologies can access the message queue, the separate and disparate technologies can engage in message passing thereby enabling communications. In particular, the message queue can expose different method calls through an application programming interface (API) for opening, writing to, reading from, and closing the message queue. Each application in turn can include logic to invoke a sequence of the method calls in order to either place a message into the message queue, or to retrieve a message from the message queue.

In message queue technology, applications share data by putting and getting messages on message queues. Generally, applications put messages to queues programmatically using an API. For example, the following pseudo-code sequence is demonstrative of a process for loading a message queue with messages programmatically through program calls to a message queue API:

```
OPEN queue
    Loop until all messages generated
        Generate message
        PUT message to queue
    EndLoop
CLOSE queue
```

Likewise, applications can retrieve messages from messages queues programmatically using the message queue API. For example, the following pseudo-code sequence is demonstrative of a process for retrieving messages from a message queue programmatically through program calls to a message queue API:

```
OPEN queue
    Loop until queue-empty
        GET message from queue
        Process message
    EndLoop
CLOSE queue
```

In message queue technology, a queue manager manages the storage of message data using internal formats transparent to applications. Queue messages may be maintained in computer memory, or stored on a permanent medium such as on a fixed disk. As such, applications are restricted to accessing discrete message data—that is, data stripped of the internal formats of the queue manager—using the API of the queue manager, typically one message at a time.

By comparison, sequential files support data storage with less complexity than a message queue. With a sequential file, data simply can be inserted within a sequential file at a specified byte position. Likewise, with a sequential file, data can be retrieved from the sequential file at a specified or relative byte position. Accordingly, a suitable API for accessing data within a sequential file could include:

```
OPEN sequential file
    Loop until all data generated
        Generate record
        WRITE record to file
    EndLoop
CLOSE sequential file
```

Thus, coding to different APIs for resource access is required depending upon whether the resource is located within a message queue or a sequential file.

BRIEF SUMMARY OF THE INVENTION

Embodiments of the present invention address deficiencies of the art in respect to message queue and sequential file management and provide a novel and non-obvious method, system and computer program product for agnostic processing of message queues and sequential files. In an embodiment of the invention, a method for agnostic processing of message queues and sequential files can be provided. The method can include receiving from an application an access request for a resource that is uniform for both a message queue and a sequential file and identifying a resource type of the resource. In response to identifying the resource type as a message queue, a corresponding access request specific to a message queue can be invoked in the message queue independently of the application. Otherwise a corresponding access request specific to a sequential file can be invoked responsive to identifying the resource type as a sequential file independently of the application.

In another embodiment of the invention, an agnostic resource data processing system can be configured for agnostic processing of message queues and sequential files. The system can include a message queue executing in a resource hosting computing system and a sequential file disposed in a resource hosting computing system. The system also can include a unified API to both the message queue and also the sequential file. The unified API can provide program code enabled to invoke independently of a coupled application, an access request in the message queue in response to receiving from the coupled application a uniform resource access request for a resource type corresponding to the message queue. The program code also can be enabled to invoke independently of the coupled application an access request in the sequential file in response to receiving from the coupled application a uniform resource access request for a resource type corresponding to the sequential file.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for agnostic processing of message queues and sequential files;

FIG. 2 is a schematic illustration of a resource data processing system configured for agnostic processing of message queues and sequential files; and, FIG. 3 is a flow chart illustrating a process for agnostic processing of message queues and sequential files.

DETAILED DESCRIPTION OF THE INVENTION

Embodiments of the present invention provide a method, system and computer program product for agnostic processing of message queues and sequential files. In accordance with an embodiment of the present invention, a resource request to access data in a resource can be received in association with either a message in a message queue or data in a sequential file in a file system. The resource can be identified as either a message queue, or a sequential file in the file system. Responsive to the identification of the resource as a message queue, the message can be accessed in the message queue to satisfy the resource request. Otherwise, responsive to the identification of the resource as a sequential file in a file system, the data in the sequential file can be accessed in the file system.

In illustration, FIG. 1 is a pictorial illustration of a process for agnostic processing of message queues and sequential files. As shown in FIG. 1, both a message queue 110A and a sequential file 110B can be configured for access by a requesting application 160 through a unified API 180. The message queue 110A can include a number of messages 120 queued therein and further can provide a message queue API 130 providing program logic for both writing messages 100A to and retrieving messages 100A from the message queue 110A. In contrast, the sequential file 110B can be stored in a file system (not shown) and can include sequentially arranged data 140 within the sequential file 110B. Like the message queue 110A, the sequential file 110B can be associated with a file system API providing program logic for both writing data 100B to and retrieving data 100B from the sequential file 110B.

Notably, unified resource request processing logic 300 can be coupled to the unified API 180. In operation, the requesting application 160 can issue a resource request 170 through a unified API 180 to access a resource irrespective of whether the resource is the message queue 110A or the sequential file 110B. The unified resource request processing logic 300 can identify the type of resource sought for access by the requesting application 160. For a message queue 110A, the unified resource request processing logic 300 can invoke a counterpart access request for a message 100A through the message queue API 130. Otherwise, the unified resource request processing logic 300 can invoke a counterpart access request for data 100B in the sequential file 110B through the file system API 150.

Of note, the unified resource request processing logic 300 can be included as part of a run-time environment such that the requesting application 160 can agnostically process resource requests to access a resource without requiring internal modification of program code. Alternatively, the unified resource request processing logic 300 can be implemented internally to the requesting application 160. As yet a further alternative, the unified resource request processing logic 300 can be implemented as a stand alone library (either static or dynamic) that can be linked at run-time or build-time to the requesting application 160.

The process described in connection with the unified resource request processing logic 300 can be implemented within a resource data processing system. In further illustration, FIG. 2 schematically shows a resource data processing system configured for agnostic processing of message queues and sequential files. The system can include one or more resource hosting computing servers 220, 230 hosting both a message queue 250 of one or more messages and a sequential file 260 of data. The resource hosting computing servers 220, 230 can be configured for communicative coupling to one or more client computing devices 210 over a computer communications network 240, for example, a local area network (LAN) or the global Internet.

Each of the client computing devices 210 can include an operating system 270 supporting the operation of a computing application 290. Further, a unified API 280 to the message queue 250 and the sequential file 260 can be provided in connection with unified resource request processing logic 300. The unified resource request processing logic 300 can include program code enabled to process uniform requests for resources from the application 290 to access a resource irrespective of whether the resource is a message queue 250 or a sequential file 260. In this regard, the program code can be enabled to identify a type for a requested resource and, in response to identifying the type of the requested resource, the program code can be enabled to issue a relevant request for access for the requested resource specific to either the message queue 250 or the sequential file 260 depending upon whether the resource type is a message queue 250 or a sequential file 260.

In further illustration of the operation of the unified resource request processing logic 300, FIG. 3 is a flow chart illustrating a process for agnostic processing of message queues and sequential files. Beginning in block 310, a request to access a resource can be received in the unified API. The requested access can include a read operation, a write operation, an open operation or a close operation, to name only a few. In block 320, the resource type for the resource can be determined to be either a message queue, or a sequential file. In decision block 330, if the resource type is determined to be a message queue, in block 340 a corresponding access request specific to the message queue can be invoked. Otherwise, in block 350 a corresponding access request specific to the sequential file can be invoked. Finally, in block 360 the process can end.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like.

Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for agnostic processing of message queues and sequential files comprising:
   executing a run-time environment in a host computer, the run-time environment comprising an application programming interface (API) exposing a function providing access to a resource irrespective of whether the resource is a message queue or sequential file, and additionally executing an application in the run-time environment;
   receiving an access request for data from a resource by the application, wherein the access request is uniform for both a message queue resource type and a sequential file resource type;
   identifying a resource type of the resource, the resource type comprising either the sequential file or a message queue; and,
   responsive to identifying the resource type as a message queue, repeatedly retrieving each message from the message queue until the message queue is empty, but otherwise invoking a corresponding access request specific to the sequential file responsive to identifying the resource type as a sequential file.

2. A resource data processing system configured for agnostic processing of message queues and sequential files, the system comprising:
   a message queue executing in a resource hosting computing system;
   a sequential file disposed in a resource hosting computing system;
   an application executing in the run-time environment; and,
   a run-time environment executing in the hosting computing system, the run-time environment comprising a unified application programming interface (API) exposing a function providing access to both the message queue and also the sequential file, the unified API providing program code in the form of a function enabled to receive an access request for data from a resource by the application, wherein the access request is uniform for both a message queue resource type and a sequential file resource type, to identify a resource type of the resource, the resource type comprising either a sequential file or a message queue, to respond to receiving a uniform resource access request from the coupled application for a resource type corresponding to a message queue by repeatedly retrieving each message from the message queue until the message queue is empty, but otherwise to invoke independently of the coupled application an access request in the sequential file responsive to receiving from the coupled application a uniform resource access request for a resource type corresponding to a sequential file.

3. A computer program product comprising a non-transitory computer usable storage memory device storing computer usable program code on the device for agnostic processing of message queues and sequential files, the computer program product comprising:
   computer usable program code for executing a run-time environment in a host computer, the run-time environment comprising an application programming interface (API) exposing a function providing access to a resource irrespective of whether the resource is a message queue or sequential file, and additionally executing an application in the run-time environment;
   computer usable program code for receiving an access request for data from a resource by the application, wherein the access request is uniform for both a message queue resource type and a sequential file resource type;
   computer usable program code for identifying a resource type of the resource, the resource type comprising either the sequential file or a message queue; and,
   computer usable program code for responsive to identifying the resource type as a message queue, repeatedly retrieving each message from the message queue until the message queue is empty, but otherwise invoking a corresponding access request specific to the sequential file responsive to identifying the resource type as a sequential file.

* * * * *